US012572930B2

(12) United States Patent
Dittmann et al.

(10) Patent No.: US 12,572,930 B2
(45) Date of Patent: Mar. 10, 2026

(54) ENABLING TRACEABLE TREES OF TRANSACTIONS

(71) Applicant: INTERNATIONAL BUSINESS MACHINES CORPORATION, Armonk, NY (US)

(72) Inventors: Gero Dittmann, Zürich (CH); Angelo De Caro, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 17/933,898

(22) Filed: Sep. 21, 2022

(65) Prior Publication Data

US 2024/0095725 A1      Mar. 21, 2024

(51) Int. Cl.
G06Q 20/38          (2012.01)
G06Q 20/40          (2012.01)

(52) U.S. Cl.
CPC ....... G06Q 20/3825 (2013.01); G06Q 20/401 (2013.01); *G06Q 2220/00* (2013.01)

(58) Field of Classification Search
CPC ............. G06Q 2220/00; G06Q 20/401; G06Q 20/3825
See application file for complete search history.

(56) References Cited

U.S. PATENT DOCUMENTS

2019/0312734 A1 * 10/2019 Wentz ................... H04L 9/3239
2019/0340619 A1   11/2019 Leong
2020/0065761 A1    2/2020 Tatchell
(Continued)

FOREIGN PATENT DOCUMENTS

EP      3540662 A1    9/2019
GB      2597592 A  *  2/2022   ............. G06F 21/64
(Continued)

OTHER PUBLICATIONS

ANONYMOUS. "Blockchain for Sustainability." Accessed Aug. 24, 2022. 22 pages. Published by Amazon. https://d1.awsstatic.com/whitepapers/blockchain-for-sustainability.pdf.
(Continued)

*Primary Examiner* — Neha Patel
*Assistant Examiner* — Davida Lee King
(74) *Attorney, Agent, or Firm* — Kelsey M. Skodje

(57)                    ABSTRACT

A disclosed technique enables a tree of transactions between entities which may be a first entity and a second entity. The technique may be implemented at a transaction recipient, which can be one of the entities or an external actor, such as a certifier. The transaction recipient accesses two transactions, including a first and second transaction, and two respective secrets, including a first and second secret. The first transaction originates from the first entity, while the second transaction originates from the second entity. The first and second transaction are obfuscated based on the first secret and the second secret, respectively. The first transaction is logically connected to the second transaction. The transaction recipient further de-obfuscates the two transactions using the two respective secrets, and cryptographically signs at least a part of the second transaction to obtain a signature, prior to allowing the second entity to access the obtained signature.

20 Claims, 6 Drawing Sheets

(56)                    References Cited

U.S. PATENT DOCUMENTS

2021/0089676 A1*  3/2021  Ford ..................... H04L 9/0825
2021/0398116 A1*  12/2021  Fang ................ G06Q 20/38215

FOREIGN PATENT DOCUMENTS

WO      WO-2019125576 A1 *  6/2019   ............... H04L 9/50
WO      WO-2021023094 A1 *  2/2021   ............... H04L 9/50

OTHER PUBLICATIONS

Westerkamp, et al., "Blockchain-Based Supply Chain Traceability: Token Recipes Model Manufacturing Processes." Published Oct. 15, 2018 by IEEE. 8 pages. In 2018 IEEE International Conference on Internet of Things (iThings) and IEEE Green Computing and Communications (GreenCom) and IEEE Cyber, Physical and Social Computing (CPSCom) and IEEE Smart Data (SmartData), pp. 1595-1602, doi: 10.1109/Cybermatics_2018.2018.00267.
Westerkamp, et al., "Tracing manufacturing processes using blockchain-based token compositions." Published May 2020 by Science Direct. 10 pages. In Digital Communications and Networks, vol. 6, Issue 2, pp. 167-176. https://www.sciencedirect.com/science/article/pii/S235286481830244X.
Williams, N., "Tokenizing the mineral supply chain." Published Jul. 8, 2019 by MineSpider. 8 pages. https://www.minespider.com/blog/tokenizing-the-mineral-supply-chain.

* cited by examiner

ENABLING TRACEABLE TREES OF TRANSACTIONS

BACKGROUND

Embodiments of the present disclosure are presented and relate to the fields of computer-implemented methods, computerized system, and computer program products, for enabling a tree of transactions between entities. Particularly, embodiments of the present disclosure relate to a technique in which a transaction recipient accesses logically connected transactions to de-obfuscate such transactions using respective secrets, prior to cryptographically signing the last transactions. Such transactions can be recorded in and executed by a blockchain to allow responsible sourcing certifications.

Responsible sourcing and sustainability are important topics in supply chains. Consumers and regulators increasingly demand reliable information, for example on organic farming, labor practices (child labor, forced labor, safety, etc.), and conflict minerals. This puts manufacturers under increasing pressure. Manufacturers have struggled to guarantee responsible sourcing. It is, in practice, very difficult to trace the required information through the supply chain. An additional challenge is to prevent certifications from being duplicated and claimed for other goods along the way.

Sustainability tracking solutions are known, which rely on track-and-trace systems involving claims about sustainability. However, such solutions cannot prevent duplicate certifications. Moreover, they cannot guarantee that certified amounts and capacities are not exceeded. For completeness, such solutions rarely cover the entire supply chain (e.g., from farmer/miner to consumer), hence leaving trust gaps that can be exploited by malicious actors.

SUMMARY

According to an embodiment of the disclosure, a computer-implemented method is presented. The method includes accessing, at a transaction recipient, two transactions and two respective secrets. The two transactions include a first transaction and a second transaction and the two respective secrets include a first secret and a second secret. The first transaction originates from a first entity, while the second transaction originates from a second entity. The first transaction and the second transaction are obfuscated based on the first secret and the second secret, respectively. The first transaction is logically connected to the second transaction, whereby at least one output of the first transaction connects to at least one input of the second transaction. The method further includes de-obfuscating the two transactions using the two respective secrets. The method further includes cryptographically signing, at the transaction recipient, at least a part of the second transaction to obtain a signature. The method further includes allowing, at the transaction recipient, the second entity to access the obtained signature.

In turn, the second entity may for instance record the second transaction in a blockchain. Such a process can be repeated for each pair of connected transactions. Such transactions can eventually be executed by the blockchain, to enforce a given transaction model. Such transactions are thus traceable and their conformity with the underlying transaction model can be audited.

The method is advantageously performed in respect of each entity of a chain of entities involved in the supply of goods or services, so as to form a tree of traceable transactions, wherein each of the transactions is cryptographically signed and recorded in a blockchain.

The tree of transactions may for instance aim at enforcing a performance of operations according to a given model. Such operations may for instance be related to the supply of goods or services by one or more entities. The transactions are designed in accordance with this model. For example, a first transaction determines an allowance for one or more operations to be performed by the second entity, while a second transaction sets an expense of an operation to be performed by the second entity. The first transaction is logically connected to the second transaction to make it possible to enforce that the expense is compatible with the allowance, in accordance with the underlying model. This model is preferably operated by the certifier as a currency exchange model. For instance, the operations include one or more transformation steps related to the supply of a good based on one or more raw materials and/or components, the model includes an input-output model, the allowance reflects quantities of the raw materials and/or components, and the expense reflects actual quantities of the one or more raw materials and/or components to be used in the operation to be performed by the second entity, as per the input-output model.

According to another embodiment, the disclosure is embodied as a computerized system (e.g., accessible by or operated by a transaction recipient) for enabling a tree of transactions as described above. Consistently with the present method, the computerized system is configured to access connected transactions, de-obfuscate the transactions using respective secrets, cryptographically sign (at least a part of) a latest transaction to obtain a signature, and allow the second entity to access the signature obtained.

According to another embodiment, the disclosure is embodied as a computer program product for enabling a tree of transactions. The computer program product includes a computer readable storage medium having program instructions embodied therewith, where the program instructions are executable by a processor, to cause the processor to perform the present method to access connected transactions, de-obfuscate the transactions using respective secrets, cryptographically sign (at least a part of) a latest transaction to obtain a signature, and allow the second entity to access the signature obtained.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

The accompanying drawings show simplified representations of devices or parts thereof, as involved in embodiments. Similar or functionally similar elements in the figures have been allocated the same numeral references, unless otherwise indicated.

Computerized systems, methods, and computer program products, embodying the present invention will now be described, by way of non-limiting examples.

DETAILED DESCRIPTION

The following description is structured as follows. General embodiments and high-level variants are described in section 1. Section 2 addresses more particular embodiments. Section 3 concerns technical implementation details. Note, the present method and its variants are collectively referred to as the "present methods". References to Sn refer to method stages, shown in the sequence diagram of FIG. 3, while numeral references pertain to devices, components, and concepts, involved in embodiments of the present invention.

Figure 1:
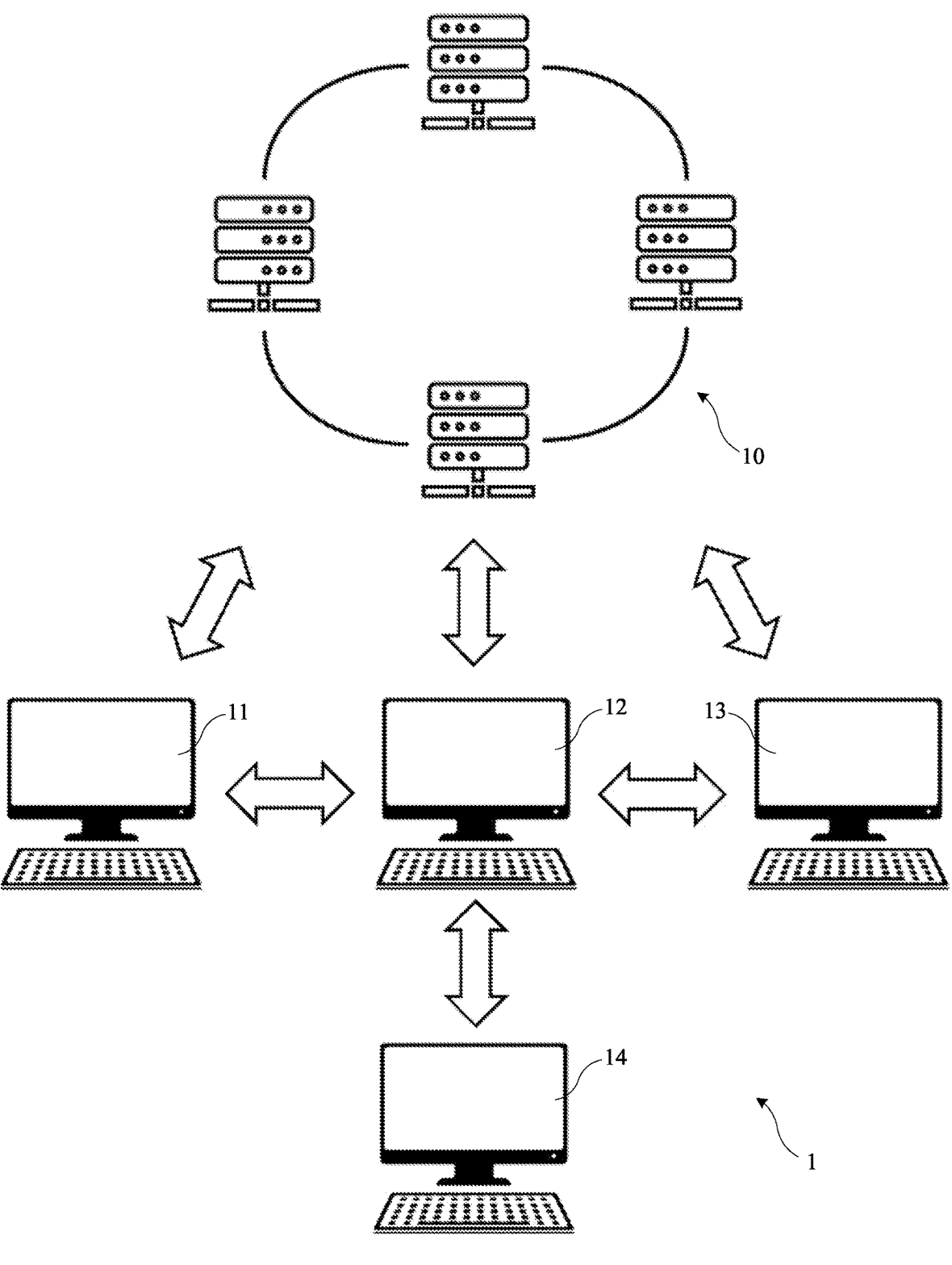
FIG. 1 is a diagram schematically illustrating computerized entities, which interact to perform a method according to embodiments.
Figure 2:
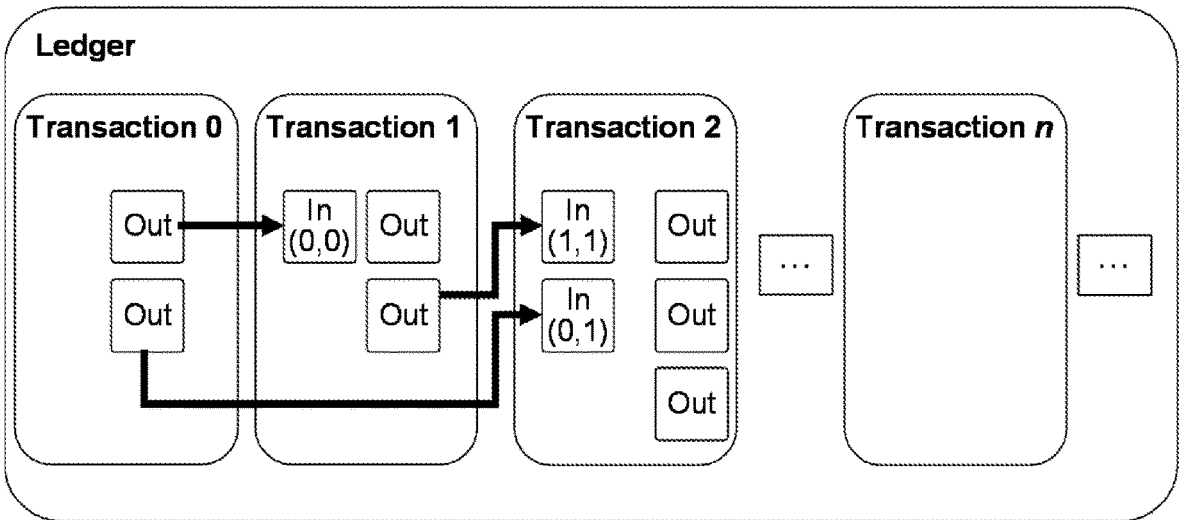
FIG. 2 is a diagram illustrating chained transactions, which are logically connected, such that at least one output of a given transaction connects to at least one input of a next transaction, as involved in embodiments.
Figure 3:
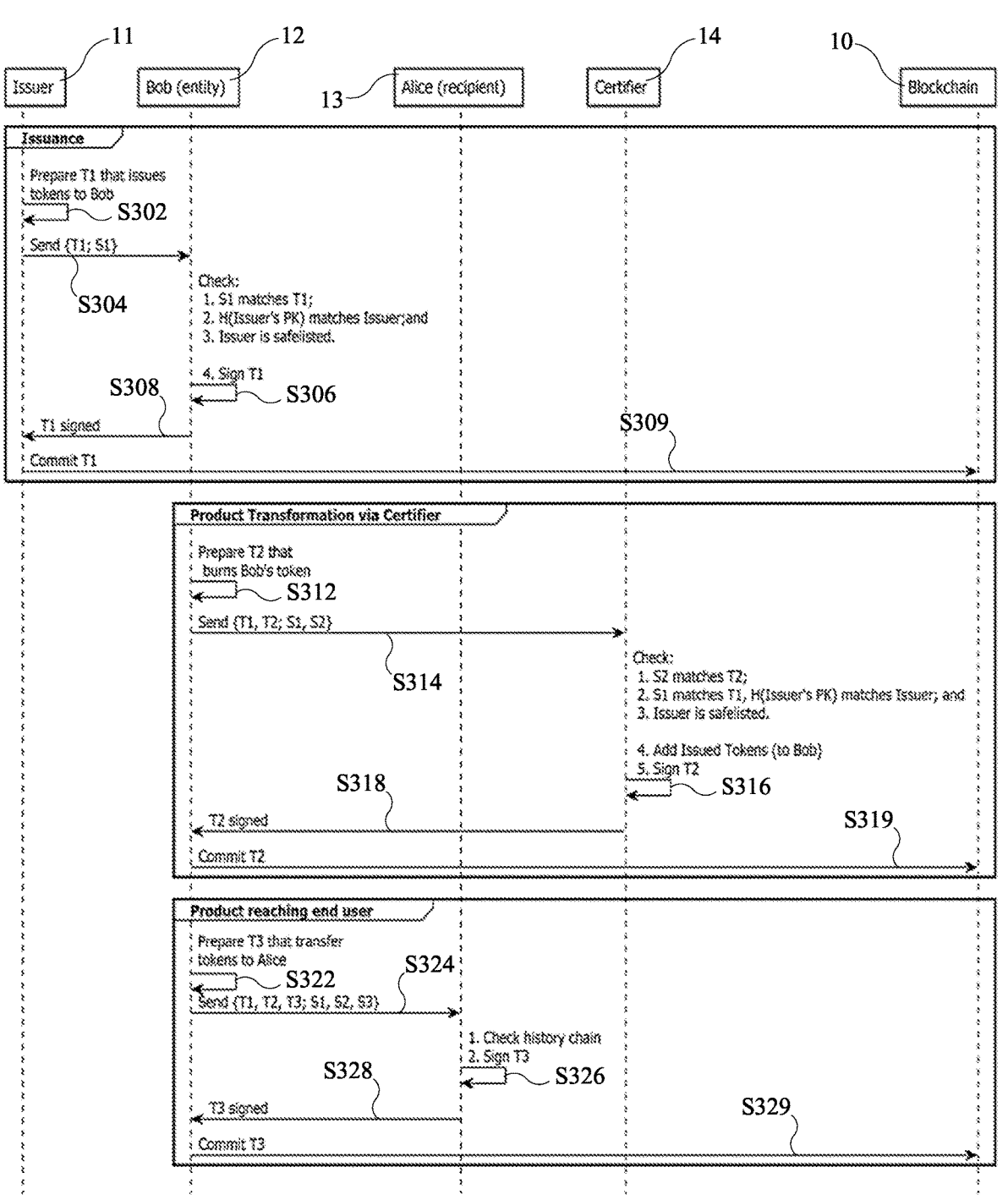
FIG. 3 is a sequence diagram illustrating high-level stages of a method of enabling a tree of transactions between entities, according to embodiments.

Section 1, General Embodiments, and High-Level Variants:

Embodiments of the disclosure are now described in reference to FIGS. 1-3. Such embodiments are related to a computer-implemented method of enabling a tree of transactions between entities.

Such entities include at least two entities, i.e., a first entity 11 and a second entity 12. In practice, however, additional entities will likely be involved. For example, FIGS. 1 and 3 assumes three entities 11, 12, 13, namely an issuer 11, an intermediate entity 12, and an end-user or consumer 13. In some implementations, additional actors can be involved, including a certifier 14 and a blockchain 10. In general, such entities 10-14 involve or include computers, computerized units, computerized systems, or the like. In some implementations, some of these entities 10-13 may correspond to computers, computerized units, computerized systems, etc. of individuals, factories, companies, or the like.

The method may be implemented at a transaction recipient, which may for instance be the certifier 14, as in the examples of FIGS. 1 and 3. In variants, the method can be successively implemented at each entity 11-13. The certifier 14 is distinct from the entities 11-13 that are bound by the transactions eventually obtained. In addition, the certifier 14 can be used to enforce a performance of operations according to one or more predetermined model(s), such as a business model, or the like, as in embodiments discussed later.

The method first includes accessing two transactions T1, T2 and two respective secrets S1, S2, see stage S314 in the sequence diagram of FIG. 3. The transaction recipient may passively receive the transactions T1, T2 actively retrieve them, and/or prepare them, or the like. The transactions include a transaction T1 and a second transaction T2, while the corresponding secrets include a first secret S1 and a second secret S2. The transaction T1 and the second transaction T2 are obfuscated based on the first secret S1 and the second secret S2, respectively.

The transactions T1, T2 have distinct entity origins. The transaction T1 originates from the first entity 11, while the second transaction T2 originates from the second entity 12. Moreover, the transaction T1 is logically connected to the second transaction T2. That is, at least one output of the first transaction T1 connects to at least one input of the second transaction T2. Not only does this connection makes it possible to trace the transactions, T1, T2, but the connection can be exploited to enforce operations in accordance with the predetermined model(s), as explained later.

In more detail, the transactions T1, T2 are electronic transactions, which may be recorded in a blockchain 10. That is, each transaction T1, T2, respectively, may be included in a block that may be added to the blockchain 10. In the present context, each transaction T1, T2 includes input data and output data. In more sophisticated approaches, the transactions T1, T2 may further include compiled code. In these instances, the transactions T1, T2 are obfuscated, e.g., encrypted or subject to a cryptographic commitment. Note, a cryptographic commitment must be distinguished from a commit operation, which consists of recording a transaction T1, T2 in the blockchain 10, as in stages discussed later.

Next, the transaction recipient de-obfuscates (at stage S316) the two transactions T1, T2, by utilizing the two respective secrets S1, S2. In addition, the transaction recipient cryptographically signs (stage S316) at least a part of the second transaction T2. After that, the transaction recipient allows (stage S318) the second entity 12 to access the obtained signature. The above stages (i.e., accessing the transactions T1, T2, de-obfuscating and signing them, and allowing the second entity 12 to access the signature) constitute the backbone of the described technique of allowing a tree of traceable transactions to be obtained.

As noted earlier, such stages may possibly be repeatedly implemented at each entity 12, 12*a*, 13 (but for the first entity 11). In other words, such stages may be repeated at each intermediate entity 12, 12*a* and the last entity 13 involved. This way, a chain (or tree) of transactions may be successively formed. Preferably, however, a same transaction recipient is repeatedly used, i.e., the certifier 14, as assumed in the examples of FIGS. 1 and 3. In that case, each new transaction is accessed by the certifier 14, as in most of the embodiments discussed below. Such a solution may have implementation advantages in practice. In addition, the certifier 14 can be used to perform additional stages, with a view to enforcing a performance of operations according to the predetermined model(s), as in embodiments discussed later in detail. The following description assumes that the transaction recipient is the certifier 14, for the sake of illustration.

For clarity, at least two transactions T1, T2 are initially accessed at stage S314 by the transaction recipient. However, (many) more transactions may possibly be accessed in practice, should the number of intermediate entities 12, 12*a* increase. For example, a second intermediary 12*a* may possibly send three transactions to the transaction recipient, and so on.

Figure 5:
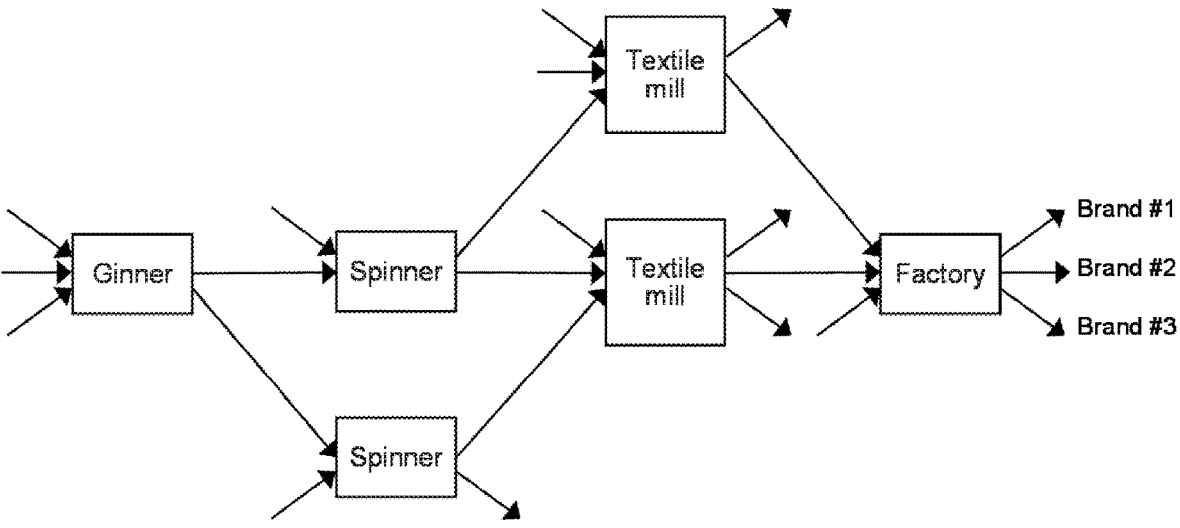
FIG. 5 is a diagram schematically illustrating entities that are connected via a tree of transactions, as obtained in embodiments.

That the two transactions T1, T2 are logically connected such that they form a chain of transactions. For example, as illustrated in FIG. 2, one or more outputs ("Out") of the transaction T1 branch into one or more inputs ("In") of the second transaction T2. Similarly, outputs of the second transaction T2 may branch into inputs of a next transaction, and so on. More generally, each transaction (but the first one) may branch from one or more upstream transactions. In other words, each transaction (but the first one) takes input from one or more previous transactions. Similarly, each transaction (but the last one) may branch into one or more downstream transactions. This eventually leads to chains of transactions, which may possibly form a tree, especially where several intermediate entities are involved. However, in simple scenarios, the tree formed restricts to a linear chain of a few transactions. For instance, the first and second transactions T1, T2 evoked above form a transaction pair, i.e., a chain. Yet, this transaction pair may possibly be extended by further transactions, which may thus possibly form a tree, having multiple branches. Since the transactions concern given entities, the connections between the transactions also result in connecting such entities, as illustrated in FIG. 5.

Such transactions (e.g., T1, T2) may be logged in blockchain 10 (or another computerized system), where they can further be executed, such that the transactions can be later audited, if necessary. The present approach can thus be used to enforce the predetermined model(s), e.g., a responsible supply chain business model.

The transaction recipient 14 may access S314 the transaction(s) T1, T2 by passively receiving transaction(s) T1, T2 or actively retrieving transaction(s) T1, T2. For example, the transaction recipient 14 may possibly fetch referenced historic transactions from the blockchain 10. The secrets S1, S2, however, are normally not readily available (at least they are not publicly available) and, therefore, may normally be passed along, off-chain, by the intermediate entity or entities 12.

When a transaction recipient 14 happens to access more than two transactions, only a subset of these transactions may have to de-obfuscated by the transaction recipient 14. For example, the transaction recipient 14 may de-obfuscate the last two transactions only (i.e., the transaction prepared last). As explained above, such transactions are logically chained (be it indirectly), such that it is sufficient to process one pair of connected transactions at a time. Moreover, each transaction may possibly be only partly de-obfuscated by the transaction recipient, to the extent needed to check the tree of transactions.

De-obfuscating transactions using their respective secrets amounts to verifying that the two secrets match the respective transactions (at least to a certain extent). De-obfuscating a transaction means that at least one output of this transaction is to be de-obfuscated, as well as at least one input. If the transaction at issue is the first (respectively the last) transaction, only one or several outputs (respectively inputs) of this transaction needs to be de-obfuscated. The transaction inputs and transaction outputs can be captured by labels, which specify output labels and input labels of the linked transactions, which logically connects the transactions. To access a true input value of given transaction, however, it is further needed to de-obfuscate the corresponding output of the upstream transaction that connects to the given transaction, hence the benefit of accessing all secrets associated with the transactions passed to the transaction recipient 14.

The cryptographic signature concerns at least a part of the second transaction T2 or, more generally, the last of the transactions accessed by the transaction recipient 14. The content of the second or last transaction that serves as a basis for the cryptographic signature can be either obfuscated, or not. What matters is to obtain a cryptographic signature, which can later be verified by other entities. If the signed content is initially obfuscated, the next recipient(s) will nevertheless still be able to verify the signed content, as the associated secret will also be supplied to them. So, the transaction content to be signed can be partial or complete, and can further be obfuscated, or not.

During stage S318, the signature of the second transaction T2 is sent back to the second entity 12 or is otherwise made available to the second entity 12. However, in practice the signed transaction, i.e., the transaction content with the signature included therein may be sent or made available. When the signature (or signed transaction) is merely made available to the second recipient (without directly sending the signature or the signed transaction to the second recipient), a further protocol can be implemented to make sure the second entity may access the associated signature.

Once the second entity accesses S318 the signed second transaction T2 and/or the associated signature, the second entity can subsequently record S319 the second transaction T2 in blockchain 10. The second transaction T2 may be recorded in an obfuscated state in the blockchain 10. That is, the transaction's T2 content may be obfuscated before being submitted to the blockchain 10. This may be achieved using cryptographic commitments and zero-knowledge proofs.

Since the above process repeats for each further transaction(s), when then may be recorded in the blockchain 10 (or another computerized system), the present technique can be used to enforce operations as specified in the transactions. More precisely, the present method can be applied to force each involved entity 11-13 to behave according to specifications captured by the signed transactions.

In that respect, transactions evoked herein are preferably jointly designed in accordance with the predetermined model(s). Still, the present invention primarily concerns the cryptographic protocol used to implement such predetermined model(s), rather than the predetermined model(s) themselves.

For example, the transactions may govern the issuance and burning of fungible tokens, to perform operations involved in a supply chain. Thus, the present methods can be performed in respect of each entity 11-13 of a chain of entities involved in the supply chain. In general, one or more intermediate entities 12, 12a may be involved, which cooperate to supply goods or services. The certifier 14 can be set in data communication with each of the entities 11-13 to ensure a correct implementation of the predetermined model(s).

In an exemplary implementation, as illustrated in FIG. 3, transaction T1 is prepared by a first entity (the issuer 11), with respect to a different or single intermediate entity 12 ("Bob"), who may also be referred to as second entity 12. The transaction T1, for instance, determines (or contributes to determining) or specifies an allowance of operations to be performed by the second entity 12. The allowance defines an amount of something that is permitted, e.g., within a set of regulations set forth by the predetermined model(s), for the second entity 12 to perform certain operations. This allowance may for instance concern money, power, energy, or other resources, such as quantities of raw materials, components, or devices, needed to perform a level or number of operations. The transaction T1 preferably captures this allowance in the form of a number or quantity of input and/or capacity tokens that may be associated with the amount of something that is permitted for the second entity 12 to perform the operations. The same approach can be applied to each further entity involved, such that each entity is given the allowance to perform the associated operations.

Conversely, the second transaction T2 typically concerns an expense or cost for an operation to be performed by the second entity 12. For example, the second transaction T2 may set the cost of the associated operation, in terms of money, power, energy, or other resources such as quantities of raw materials, components, or devices, as needed to perform this operation. The second transaction T2 may captures this expense in the form of a number or quantity of input and/or capacity tokens to be burned. In an implementation, the first and second transactions T1, T2 are executed by the blockchain 10, whereas the certifier 14 verifies, on the one hand, that the second transaction T2 is compatible with the first transaction T1 and, on the other hand, that the two transactions T1, T2 are compatible with the predetermined model(s).

That the transaction T1 is logically connected to the second transaction T2 may be exploited by the certifier 14 to make sure that the expense set by the second transaction T2 is compatible with the allowance specified in the first transaction, in accordance with the predetermined model(s). That is, each intermediate 12, 12a entity can incur costs or expenses (i.e., spend an amount of something, e.g., material, power, money, etc.) to the extent permitted by the previous transactions. In other words, such expenses must be compatible with the allowance constraints defined by the previous transactions.

Note, a single transaction T1 may initially be prepared in respect of all intermediate entities involved. In such case, the same initial transaction T1 is applicable to all intermediate entities involved. In variants, the transaction T1 is prepared for each distinct entity 12, 12a involved. In other words, several initial transactions T1 are initially prepared (one for each intermediate entity). More generally, several variants can be contemplated, depending on the predetermined model(s).

In the scenario illustrated in FIG. 3, the second entity 12 commits, upon recording T2 in the blockchain 10, to perform an operation at a given cost (which may be imposed or predetermined according to the predetermined model(s) in use) and accordingly acknowledges that the cost of the operation will be deducted from the allowance or remaining allowance. In practice, this may be achieved by burning one or more tokens corresponding to this expense. The whole mechanism may be implemented by burning an input token to deduct the expense and then minting (issuing) a new token for the remainder. Note, only fractions of tokens may possibly be burned, if necessary.

The status of the second entity 12 can be updated (preferably by the certifier 14) based on the expense set in the second transaction T2, in accordance with the predetermined model(s). This update may optionally make use of the allowance as determined by the first transaction T1. So, the predetermined model(s) can guarantee that each entity operates within boundaries associated therewith.

The proposed solution can be used to force the entities to pass all the secrets (as necessary to open the transactions) to the downstream recipients, via off-chain communications. As illustrated in FIG. 3, the issuer 11 sends to Bob 12 the secrets S1 of transaction T1, Bob 12 sends to the certifier 14 the secrets S1 and S2 of transactions T1 and T2, and Bob 12 finally sends to Alice 13 the secrets S1, S2, and S3 of transactions T1, T2, and T3. Thus, Alice 13 can use the secrets received to open all the transactions (e.g., commitments) and check the content of the transactions.

The entities 11-12 may be forced to send all the necessary secrets to the downstream next recipient 12-13, after ensuring the sender is not malicious. More particularly, a new validation predicate, which requires the transaction recipient to sign the latest transaction, provides that all the downstream transactions involved thus far are duly verified.

In the example of FIG. 3, the certifier 14 signs the transaction T2 after having verified all transactions involved so far (i.e., T1 and T2) can safely trigger a commitment by the second entity 12, who can subsequently record the transaction T2 in the blockchain 10. A similar mechanism is applied at each level. In other words, the issuer 11 commits to T1 upon receiving a version thereof as signed by the entity 12, and the entity 12 commits to a further transaction T3 upon receiving a signed version thereof by recipient 13.

In this way, if a sender is malicious and does not send the secrets or the secrets are incomplete, the next recipient will not sign the latest transaction involved. This serial process may ensure that the final recipient will receive all the information needed to reconstruct and check the history of transactions. In other words, the present approach makes it possible to check a history of linked transactions, even in a privacy-preserving context. Such transactions are preferably designed in accordance with the predetermined model(s) and can thus be used to enforce operations according to such predetermined model(s).

The following describes embodiments of the disclosure, notably in reference to FIG. 3. As seen in this sequence diagram, the first entity (the issuer 11) initially prepares S302 a transaction T1 and then obfuscates it based on a first secret S1. Next, the first entity 11 sends S304 the transaction T1, as obfuscated, together with the first secret S1, to the second entity 12 (Bob). In the example of FIG. 3, the first entity 11 is assumed to be distinct from the certifier 14. In variants, the issuer 11 and the certifier 14 may be (or form part of) a same entity.

As noted earlier, the transaction T1 may specify the issuance of one or more fungible tokens, associated with the allowance, to the second entity 12. The second transaction T2 may then be prepared S312 by the second entity 12 based on the allowance defined by the transaction T1, to set a cost in accordance with the predetermined model(s).

Upon receiving S304 the transaction T1 (still obfuscated) and the first secret S1, the second entity 12 de-obfuscates S306 the first transaction T1 based on the first secret S1. This amounts to verifying S306 that the first secret S1 matches the transaction T1. In addition, the second entity 12 cryptographically signs S306 the transaction T1 (or part thereof) to obtain a first signature and sends S308 the first signature to the first entity 11. The second entity 12 may send the whole transaction T1, as signed, instead of the sole signature. Before de-obfuscating the transaction T1 and signing it, the second entity 12 preferably verifies S306 the first entity 11, e.g., based on a public key thereof. Having done so, the second entity 12 may then verify S306 that the first entity 11 (as verified) is safe listed.

Next, upon receiving the first signature (or the transaction T1, as signed), the first entity 11 records S309 the first signature and the transaction T1, as obfuscated based on the first secret S1, in the blockchain 10. This way, the issuer 11 commits to perform an operation as specified in the first transaction, e.g., to issue one or more fungible tokens to the second entity. This token may be associated with the given allowance, as noted above. In turn, the blockchain 10 can execute the transaction T1. Note, apart from stages aiming at recording transactions in the blockchain 10, the other stages described herein are performed off-chain i.e., by way of data communication performed outside of the blockchain 10.

As further seen in FIG. 3, the second entity 12 can then prepare S312 the second transaction T2, by utilizing the associated connected component(s) of the transaction T1. In addition, the second entity 12 obfuscates S312 the second transaction T2, based on the second secret S2. The second entity 12 subsequently sends S314 obfuscated versions of the two transactions T1, T2, together with the two respective secrets S1, S2, to the certifier 14, for the latter to access S314 the two transactions T1, T2 and the two respective secrets S1, S2. In turn, the transaction recipient 14 performs operations S316. In other words, after accessing S314 the transactions, certifier 14 de-obfuscates S316 them and cryptographically sign S316 at least a part of the latest transaction (T2), prior to allowing S318 the entity 12 to access the obtained signature.

In addition, the certifier 14 may be tasked with updating S316 a status of the second entity 12. More generally, the certifier 14 may similarly update statuses of all intermediate entities 12, 12a involved, based on pairs of transactions (e.g., T1, T2) involving such entities. The status update is performed in accordance with the predetermined model(s). In the example of FIG. 3, the certifier 14 may for instance update the status of Bob 12 based on one or each of the two transactions T1, T2, as de-obfuscated. The certifier 14 may further verify S316 the entities involved so far (or at least some of them), based on public keys thereof. In particular, the certifier 14 may verify the issuer 11.

After the certifier 14 has allowed S318 the entity 12 to access the obtained signature (or the whole transaction T2 as signed), this entity 12 may access the signature (or the whole transaction as signed) and record S319 both the signature and the second transaction T2 (or the sole transaction, as signed) in the blockchain 10. As noted earlier, the second transaction T2 is recorded in an obfuscated state, e.g., as obfuscated based on the second secret S2. For example, upon receiving the signed transaction T2 from the certifier 14, Bob 12 records the second transaction in the blockchain 10. Not only the blockchain 10 can verify the signature but it can also execute the transaction T2.

Note, the blockchain 10 may verify that the transaction is valid. A transaction is valid if a given validation predicate is satisfied. Essentially, the predicate contains the rules that must be followed by the transactions. Now, because the content of the transaction is obfuscated, a zero-knowledge proof solution is used to prove that the predicate is satisfied.

Next, the intermediate entity 12 may prepare a further transaction T3, directed to a third entity 13. The latter may be another intermediate entity or an end-user ("Alice") 13, as depicted in FIG. 3. In this example, the entity 12 prepares S322 a third transaction T3 that is connected to one or each of the transaction T1 and the second transaction T2. The entity 12 subsequently obfuscates S322 the third transaction T3 (based on a third secret S3) and sends S324 obfuscated versions of the transactions T1-T3, as well as the corresponding secrets S1-S3, to the third entity 13. For example, the third transaction T3 may stipulate the supply of a good or service to the third entity 13.

In turn, the third entity 13 may check S326 the tree of transactions obtained so far, i.e., by de-obfuscating the obfuscated versions of the transactions T1-T3, based on the respective secrets S1-S3. The third entity 13 may then cryptographically sign S326 the third transaction T3 to obtain a third signature (or a signed transaction) and send S328 the third signature (or the signed transaction as a whole) to the second entity 12.

Upon receiving the third signature (or the signed transaction T3) from the third entity 13, the second entity 12 may record S329 the third signature and the third transaction (as obfuscated based on the third secret S3) in the blockchain 10. Doing so, the second entity 12 may for example commit to supply a good or a service to the third entity 13, in accordance with the transaction T3. In turn, the blockchain 10 executes the third transaction T3.

Again, the example of FIG. 3 assumes only one intermediate entity 12. However, the present methods may, in general, possibly be performed in respect of each of several intermediate entities 12, 12a of a chain of entities, e.g., involved in the supply of goods or services. Doing so results in a tree of traceable transactions, where each of transaction is cryptographically signed and recorded in the blockchain 10. Thus, the present approach can be used for tracking compliance with the predetermined model(s), such as compliance with responsible sourcing certifications.

In particular, transactions may be designed so as to enforce the performance of operations according to a given model, where such operations relate to the supply of goods or services by each intermediate entities 12, 12a. The transactions must be designed in accordance with the predetermined model(s). Assume, for example, that the certifier accesses two connected transactions T1, T2, which relate to a given intermediate entity 12. As noted earlier, the transaction T1 may determine an allowance for one or more operations to be performed by this entity 12, while the second transaction T2 may set an expense of an operation to be accordingly performed by this entity 11. In that case, the transaction T1 may be logically connected to the transaction T2 to enforce that the expense is compatible with the allowance, in accordance with the predetermined model(s). In turn, the operation performed S316 by the certifier 14 to update S316 the status of this entity 12 may for instance cause to credit the second entity 12 with an amount in accordance with the allowance as specified in the transaction T1, as per operations (executions of transactions) subsequently performed by the blockchain 10.

More generally, instead of defining an allowance and an expense, the two transactions T1, T2 may define constraints to, and actual parameters of, the operation performed by the second entity 12. The predetermined model(s) may effectively be a currency exchange model.

For example, the predetermined model(s) may rely on an input-output model. In that case, the operations involved may include one or more transformation stages, e.g., related to the supply of a good based on one or more raw materials, devices, and/or components. As noted earlier, the allowance set forth by the transaction T1 may reflect quantities of the raw materials and/or components, while the expense reflects actual quantities of the raw materials and/or components to be used in the operation to be performed by the second entity 12, as per the input-output model. In particular, the predetermined model(s) may be a factory model that converts input tokens to output tokens in a form of currency exchange. An example of this application is discussed in section 2.2.

Figure 6:
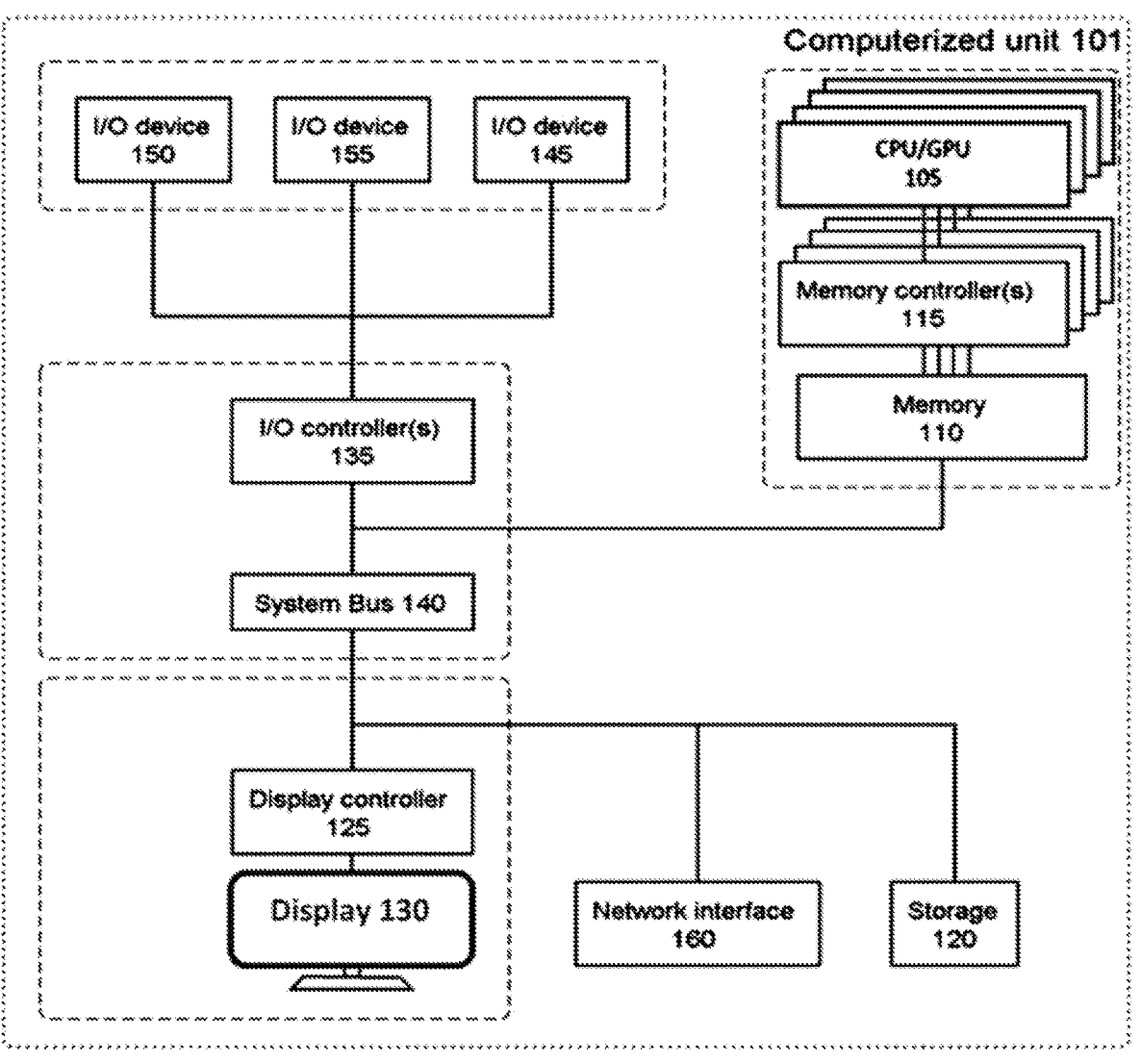
FIG. 6 schematically represents a general-purpose computerized system, suited for implementing one or more method stages as involved in embodiments of the invention.

Another embodiment of the disclosure concerns a computerized system. Such a system typically includes one or more computerized units 101 such as shown in FIG. 6. The system may for instance form part of, be operated, or somehow be accessible by a certifier 14, to enable a tree of transactions between entities, consistently with the present techniques.

The system may notably include processing complex 105, a memory 110, and storage means 120. In practice, the latter store typically computerized methods that can be loaded in the memory, thereby configuring the system to implement methods stages as described earlier. In all cases, the system is configured to access connected transactions and respective secrets, de-obfuscate the transactions using the respective secrets, cryptographically sign (at least a part of) the latest transaction to obtain a signature and allow an intermediate entity to access the signature obtained, in operation.

The system may typically form (and form part of) a computerized network 1. For instance, in FIG. 1, this network 1 includes computerized units of each of the entities 11-14 involved, as well as the blockchain 10. Each entity 11-14 may include one or more computerized units 101 such as shown in FIG. 6. The unit 101 is described in detail in section 3.1.

Closely related, another embodiment relates to a computer program product for enabling a tree of transactions between entities. The computer program product comprises a computer readable storage medium having program instructions embodied therewith. The program instructions are executable by processing complex 105 of a transaction recipient, e.g., including a computerized system such as evoked above. This, in operation, causes the processing means to perform stages according to the present methods. Such a computer program product is described in detail in section 3.2.

The above embodiments have been succinctly described in reference to the accompanying drawings and may accommodate a number of variants. Several combinations of the above features may be contemplated. Examples are given in the next section.

2. Embodiments

2.1. First Implementation:

Respective stages are performed at an issuer 11, certifier 14, one or more intermediate entities 12, and/or recipient 13. Such stages aim at enforcing a chain (or tree) of responsible operations of transactions, related to the supply of goods or services. Secrets are involved in the preparation of a set of blockchain transactions associated with the operations. The operations are to be performed by the intermediate entities 12. The transactions govern the issuance and burning of fungible tokens. The method requires each entity involved to verify that each secret matches each of the transactions, sign an initial transaction T1 from the issuer 11 for the latter to commit to this transaction in the blockchain 10. Note, the issuer 11 commits to an initial transaction T1 in the blockchain only if the concerned 12 entity has signed the transaction T1 after having verified that the transaction T1 matches the respective secret S1. Similarly, each entity prepares a next transaction based on a further secret and sends all secrets and transactions to the next recipient for the latter to verify all transactions involved so far.

Assume that a single intermediate entity 12 is involved, for simplicity, as in FIG. 3. The certifier 14 validates the transfer of a number of issued fungible tokens to entity 12 as per the transaction T1 and signs the transaction T2, according to which the entity 12 commits to burn a number of tokens allowed as per the transaction T1 issued by the issuer 11. In other words, the transaction T2 is meant to burn a subset of the number of fungible tokens allowed as per T1. So, the entity 12 commits to the transaction T2 in the blockchain upon receiving the signed transaction from the certifier 14. The entity 12 then prepares a transaction T3, based on or otherwise associated with a secret S3, where the transaction T3 corresponds to operations meant to supply a good or service to a recipient 13. All transaction data T1-T3 and the corresponding secrets S1-S3 are sent to the end-user 13 for the end-user 13 to verify that the secrets S1-S3 match the transactions T1-T3. The end-user 13 then signs the transaction T3. After that, the entity 12 records the transaction T3 in the blockchain 10 and accordingly commits to supply the good or service.

Figure 4:
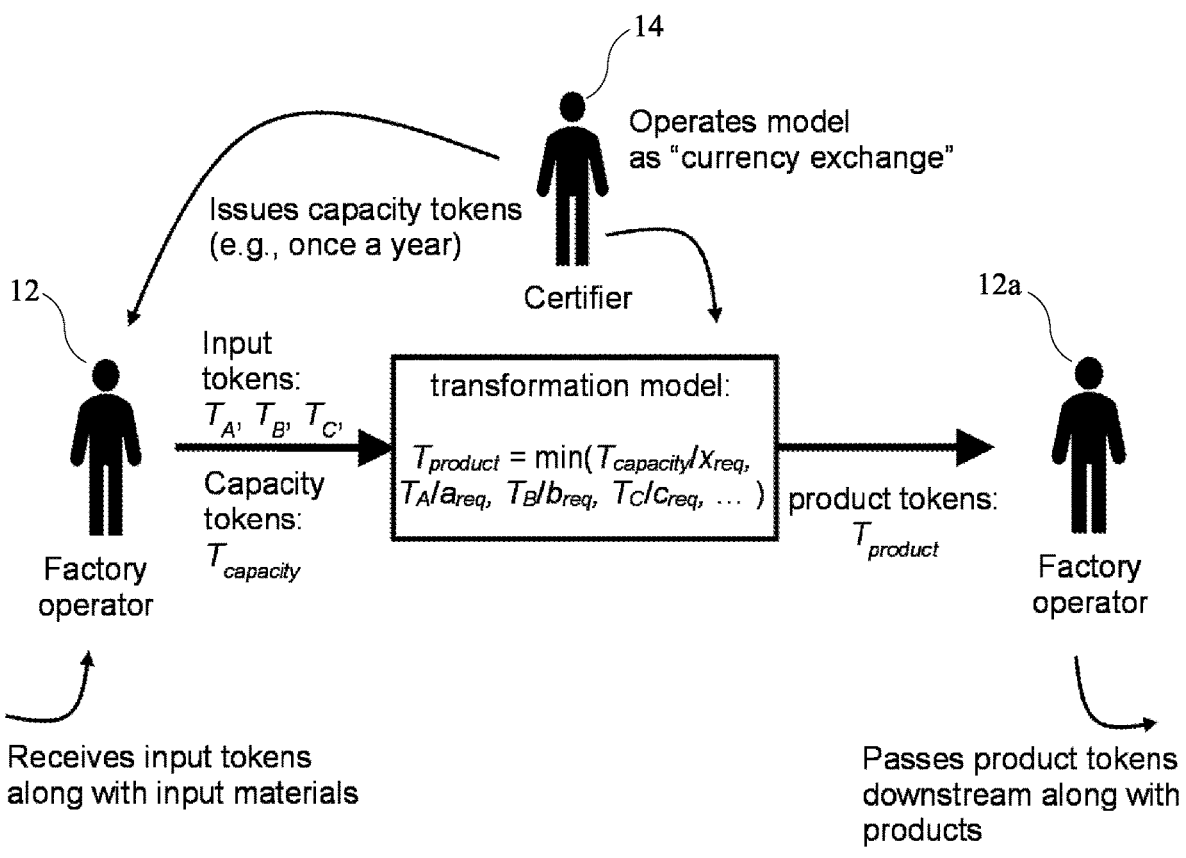
FIG. 4 is a diagram schematically illustrating a transformation model, according to which certain operations are to be performed by entities, as involved in embodiments.

2.2 Factory Implementation:

As illustrated in FIG. 4, a factory operator 12 may receive input tokens TA, TB, TC (as per one or more initial transactions prepared by an issuer) along with input materials. Meanwhile, the certifier 14 (acting as issuer) may issue capacity tokens Tcapacity (e.g., once a year) reflecting the production capacity of the factory operator 12 (e.g., a sustainable or ethical production capacity as per the underlying business model). The issuance and burning of the fungible tokens are governed by corresponding transactions, which are validated by the certifier 14 and eventually executed by a blockchain 10, see FIG. 1. This amounts to implementing the predetermined model that ensures that certain constraints are respected. In the simple example of FIG. 4, this constraint is captured as Tproduct=min(Tcapacity/xreq, TA/areq, TB/breq, TC/creq, . . . ). Here, Tproduct is the resulting amount of product, Tcapacity is the available production capacity, while TA, TB, and TC, represent amounts of different input materials, respectively, and xreq, areq, breq, and creq, represent the respective amounts required for one unit of product. The above constraint expresses the maximum amount of product that can be produced by a given amount of inputs. Inputs and outputs may be represented by tokens.

The certifier 14 issues tokens Tproduct corresponding to the products produced by the entity 12 and passes them to entity 12 who, in turn, can pass them on to the next entity 12a, e.g., a factory operator, who is a product recipient. In general, each factory operator receives product tokens and can then pass them to a downstream recipient along with a physical product. The factory operator who passes the input tokens to the transformation receives the resulting product tokens. That is, product tokens are passed downstream, along with the products.

The role of the certifier 14 is to update the statuses of each entity 12, 12a, in accordance with the model, which also validates the transactions. In practice, the certifier 14 can implement the transformation by burning input tokens and issuing product tokens, whereby each intermediate entity 12 can then pass a newly generated product token to a next entity 12a. Such transactions eventually form a tree, such as depicted in FIG. 5. More precisely, the transactions form edges of the tree. In FIG. 5, the transactions are represented by arrows, which connect upstream entities to downstream entities. The entities consist of ginners, spinners, textile mills, factories, and brands. In other words, the end entities are the brands in this example, though the model could be extended to consumers.

The transactions may notably define input units and unit costs. For example, the ginner (left-hand side) may receive an allowance for 75 units of organic cotton and pass along 90 units of organic fiber to a spinner. In other words, the ginner passes product tokens downstream along with the corresponding products. In turn, a spinner receives a token for 90 units of organic fiber and passes a token for 60 units of organic yarn. The textile mill may similarly receive tokens for units of organic yarn and output tokens for units of organic fabric. Eventually, the factory receives tokens for units of organic fabric and outputs tokens units of organic shirts, which are received by the brands. Each shirt may accordingly come with, e.g., "credits" for certified organic material and decent working conditions, where the credits are issued by certification authorities. Such transactions are traceable and can be audited. For example, the brands may check all transactions involved in the supply of the shirts. If necessary, such transactions may be audited by an independent entity, e.g., via the certifier 14.

3. Technical Implementation Details

3.1 Computerized Units

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly-interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

For instance, the network 1 shown in FIG. 1 comprises computerized units 101 (e.g., general- or specific-purpose computers), such as shown in FIG. 6. Each unit 101 may interact with other, typically similar units 101, to perform stages according to the present methods.

In exemplary embodiments, in terms of hardware architecture, as shown in FIG. 6, each unit 101 includes at least a processor complex 105 that includes at least one processor, which may be referred herein as processors 105, and a memory 110 coupled to a memory controller 115. Several processors (CPUs, and/or GPUs) may possibly be involved in each unit 101. To that aim, each CPU/GPU may be assigned a respective memory controller.

One or more input and/or output (I/O) devices 145, 150, 155 (or peripherals) are communicatively coupled via a local input/output controller 135. The I/O controller 135 can be coupled to or include one or more buses and a system bus 140, as known in the art. The I/O controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software. The processors 105 can be any custom made or commercially available processor(s). In general, they may involve any type of semiconductor-based microprocessor (in the form of a microchip or chip set), or more generally any device for executing software instructions.

The memory 110 typically includes volatile memory elements (e.g., random-access memory), and may further include nonvolatile memory elements. Moreover, the memory 110 may incorporate electronic, magnetic, optical, and/or other types of storage media.

Software in memory 110 may include one or more separate programs, each of which comprises executable instructions for implementing logical functions. In the example of FIG. 6, instructions loaded in the memory 110 may include instructions arising from the execution of the computerized methods described herein in accordance with exemplary embodiments. The memory 110 may further load a suitable operating system (OS). The OS essentially controls the execution of other computer programs or instructions and provides scheduling, I/O control, file and data management, memory management, and communication control and related services.

Possibly, a conventional keyboard and mouse can be coupled to the input/output controller 135. Other I/O devices 140-155 may be included. The computerized unit 101 can further include a display controller 125 coupled to a display 130. The computerized unit 101 may also include a network interface or transceiver 160 for coupling to a network, to enable, in turn, data communication to/from other, external components, e.g., other units 101.

The network transmits and receives data between a given unit 101 and other devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

3.2 Computer Program Products

The present invention may be a method, and/or a computer program product. The computer program product may include a computer readable storage medium (or media) having computer readable program instructions thereon for causing processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or diagram block or blocks.

The computer readable program instructions may also be loaded onto a computer, other programmable data processing apparatus, or other device to cause a series of operational stages to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant, or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

The invention claimed is:

1. A computer-implemented method comprising:

accessing, at a transaction recipient, two transactions and two respective secrets, wherein the two transactions include a first transaction and a second transaction and the two respective secrets include a first secret and a second secret, wherein the first transaction and the first secret originates from a first entity, while the second transaction, the second secret, and a first signature that is associated with the first transaction originates from a second entity, the first transaction and the second transaction are obfuscated based on the first secret and the second secret, respectively, the first transaction is logically connected to the second transaction, whereby at least one output of the first transaction connects to at least one input of the second transaction, and the transaction recipient accesses the first transaction and the first signature from a blockchain and accesses the first secret and the second secret from the second entity;

de-obfuscating, at the transaction recipient, the two transactions using the two respective secrets;

cryptographically signing, at the transaction recipient, at least a part of the second transaction to obtain a second signature; and allowing, at the transaction recipient, the second entity to both access the second signature and to record the second signature and the second transaction to the blockchain.

2. The method according to claim 1, wherein the transaction recipient is a certifier, and wherein the method further comprises, at the certifier, updating a status of the second entity based on one or each of the two transactions, as de-obfuscated.

3. The method according to claim 1, wherein the method further comprises, at the second entity, and after allowing the second entity to both access the obtained second signature and record the second signature and the second transaction to the blockchain, accessing the second signature, and recording the second signature and the second transaction in the blockchain.

4. The method according to claim 3, wherein the method further comprises, at the blockchain, executing the second transaction.

5. The method according to claim 1, wherein the method further comprises, at the first entity, preparing the first transaction, obfuscating the first transaction based on the first secret, and sending the first transaction, as obfuscated, together with the first secret, to the second entity.

6. The method according to claim 5, wherein the method further comprises, at the second entity, receiving the first secret and the first transaction as obfuscated, de-obfuscating the first transaction based on the first secret, cryptographically signing at least a part of the first transaction to obtain the first signature, and sending the first signature to the first entity.

7. The method according to claim 6, wherein the method further comprises, at the first entity, recording the first signature and the first transaction in the blockchain.

8. The method according to claim 7, wherein the method further comprises, at the blockchain, executing the first transaction.

9. The method according to claim 6, wherein the method further comprises, at the second entity, verifying that the first entity, as verified, is safe listed.

10. The method according to claim 6, wherein the method further comprises, at the second entity, preparing the second transaction, in accordance with the first transaction, obfuscating the second transaction based on the second secret, and sending obfuscated versions of the two transactions and the two respective secrets to the transaction recipient, to enable the transaction recipient to access the two transactions and the two respective secrets.

11. The method according to claim 6, wherein the method further comprises, at the second entity, preparing a third transaction that is logically connected to one or each of the first transaction and the second transaction, obfuscating the third transaction based on a third secret, and sending obfuscated versions of the first transaction, the second transaction, and the third transaction, as well as the first secret, the second secret, and the third secret, to a third entity.

12. The method according to claim 11, wherein the method further comprises, at the third entity, checking a tree of transactions by de-obfuscating the obfuscated versions of the first transaction, the second transaction, and the third transaction, based on the first secret, the second secret, and the third secret, respectively.

13. The method according to claim 12, wherein the method further comprises, at the third entity, cryptographically signing the third transaction to obtain a third signature, and sending the third signature to the second entity.

14. The method according to claim 13, wherein the method further comprises:

at the second entity, recording the third signature and the third transaction, as obfuscated based on the third secret, in the blockchain upon receiving third signature from the third entity, and at the blockchain, executing the third transaction.

15. The method according to claim 2, wherein the method is performed in respect of each entity of a chain of entities involved in a supply of goods or services, to form a tree of traceable transactions, wherein each of the transactions is cryptographically signed and recorded in the blockchain.

16. The method according to claim 15, wherein the tree of transactions enforces a performance of operations according to a predetermined model, the operations related to the supply of goods or services by one or more entities, and the two transactions are designed in accordance with the predetermined model, whereby the first transaction determines an allowance for one or more operations to be performed by the second entity and the second transaction sets an expense of an operation to be performed by the second entity, and the first transaction is logically connected to the second transaction to enforce that the expense is compatible with the allowance, in accordance with the predetermined model.

17. The method according to claim 16, wherein the predetermined model is operated by the certifier as a currency exchange model.

18. The method according to claim 16, wherein the operations include one or more transformation steps related to the supply of a good based on one or more raw materials and/or components, the predetermined model includes an input-output model, the allowance reflects quantities of the raw materials and/or components, and the expense reflects actual quantities of the one or more raw materials and/or components to be used in the operation to be performed by the second entity, as per the input-output model.

19. A computerized system comprising:

a processor; and a memory in communication with the processor, the memory containing instructions that, when executed by the processor, cause the processor to:

access two transactions, including a first transaction and a second transaction, and two respective secrets, including a first secret and a second secret, wherein, in operation, the first transaction and the first secret originates from a first entity, while the second transaction, the second secret, and a first signature that is associated with the first transaction originates from a second entity, the first transaction and the second transaction are obfuscated based on the first secret and the second secret, respectively, the first transaction is logically connected to the second transaction, whereby at least one output of the first transaction connects to at least one input of the second transaction, and a transaction recipient accesses the first transaction and the first signature from a blockchain and accesses the first secret and the second secret from the second entity;

de-obfuscate the two transactions using the two respective secrets;

cryptographically sign at least a part of the second transaction to obtain a second signature; and allow the second entity to both access the second signature and to record the second signature and the second transaction to the blockchain.

20. A computer program product, the computer program product comprising a non transitory computer readable storage medium having program instructions embodied therewith, the program instructions executable by a processor, to cause the processor to:

access two transactions, including a first transaction and a second transaction, and two respective secrets, including a first secret and a second secret, wherein the first transaction and the first secret originates from a first entity, while the second transaction, the second secret, and a first signature that is associated with the first transaction originates from a second entity, the first transaction and the second transaction are obfuscated based on the first secret and the second secret, respectively, the first transaction is logically connected to the second transaction, whereby at least one output of the first transaction connects to at least one input of the second transaction, and the transaction recipient accesses the first transaction and the first signature from a blockchain and accesses the first secret and the second secret from the second entity;

de-obfuscate the two transactions using the two respective secrets;

cryptographically sign at least a part of the second transaction to obtain a second signature; and allow the second entity to both access the second signature and to record the second signature and the second transaction to the blockchain.

* * * * *